United States Patent [19]

Yuasa et al.

[11] Patent Number: 4,831,318
[45] Date of Patent: May 16, 1989

[54] POSITIONING CONTROL SYSTEM

[75] Inventors: Yasuhiro Yuasa; Minoru Ito, both of Tokyo, Japan

[73] Assignee: Kabushiki Kaisha SG, Tokyo, Japan

[21] Appl. No.: 101,813

[22] Filed: Sep. 28, 1987

[30] Foreign Application Priority Data

Sep. 29, 1986 [JP] Japan .................... 61-228473

[51] Int. Cl.$^4$ ............................................ G05G 5/00
[52] U.S. Cl. ..................................... 318/626; 318/621; 123/416
[58] Field of Search .................. 318/626, 621; 123/416

[56] References Cited

U.S. PATENT DOCUMENTS 4,548,185 10/1985 Pozniak ................................ 123/571

Primary Examiner—William M. Shoop, Jr.
Assistant Examiner—Saul M. Bergmann
Attorney, Agent, or Firm—Spensley Horn Jubas & Lubitz

[57] ABSTRACT

Position of an object is detected by a position detector (10) and position data detected by this position detector is stored in a memory circuit (11). A time data supply section (21) supplies time data ($\Delta t$) as a lead compensation parameter. A compensation circuit (22) reads out position data (Dx ($-\Delta T$)) for a preceding time corresponding to the supplied time data ($\Delta t$) from the memory circuit (11) and corrects at least one of present position data (Dx) and target position data (Sx) in accordance with the difference between the read out position data and the present position data detected by the position detector thereby performing lead compensation. A control signal relating to the position of the object is generated in accordance with the present position data corrected by the compensation cirucit and the target position data and the positioning control is made by this control signal.

10 Claims, 3 Drawing Sheets

POSITIONING CONTROL SYSTEM

BACKGROUND OF THE INVENTION

This invention relates to a positioning control system which can be used for positioning control in various power units such as an electric motor and a hydraulic cylinder and, more particularly, to an improvement in lead compensation in the positioning control system and, more particularly, to employment of time data as a lead compensation parameter in such system and, further, to such system having a learning function.

In controlling a machine by detecting position of the machine by means of a cam switch, limit switch or the like mounted on the machine and performing necessary controls in response to position detection output, there arises time delay between a time point at which this position detection output is produced and a time point at which the control responsive to this position detection output is exercised upon the machine. Such time delay causes shifting of position in appearance at which the switch or the like device is actuated thereby giving rise to the inconvenience that an accurate control of the machine is hampered. For eliminating such inconvenience, it has been a general practice to perform compensation to shift the actuating position of the limit switch or the like or position detection data or positioning target value by an amount corresponding to the delay in time or operation. This compensation is generally called lead compensation.

The simplest example of lead compensation is mounting of a limit switch or the like detection device at a position shifted from a desired position by an amount of lead compensation. The amount of time delay however is not uniform but is varied depending upon the operation speed of the machine. The amount of lead compensation must therefore be varied in accordance with the speed of the machine so that the mounting position of the switch or the like must be changed each time the speed of the machine is changed.

For overcoming this inconvenience, there is a prior art system according to which a position detector capable of continuously detecting position of a machine is provided instead of using limit switch or the like and a target position detection output is obtained by comparing position detection data of the position detector with an established target position value. In this prior art system, lead compensation is achieved by detecting the speed of the machine, obtaining the amount of lead compensation in response to the detected speed and correcting position detection data or target position data in accordance with this amount of lead compensation. The principle of this system is shown in FIG. 7. In FIG. 7, a lead amount $\theta a$ is obtained by a lead amount operation circuit 1 in accordance with speed $v$ of the machine obtained by a speed detector 2 and lead compensation parameter a established depending upon operation conditions of the machine and lead compensation is achieved by adding the lead amount $\theta a$ and position data X detected by a position detector 3 together and thereby advancing, in appearance, data representing the present position of the machine by the lead amount $\theta a$. In this case, the operation circuit 1 may be so constructed that the lead amount $\theta a$ is obtained by implementing operation of a predetermined function $f(v)$ in real time or that a memory prestoring lead amounts $\theta a$ corresponding to various speeds of the machine is provided and corresponding lead amount is read out in response to the speed $v$ of the machine.

The prior art system has the disadvantages that the provision of the speed detector results in high manufacturing cost, that in case the operation of the function $f(v)$ for obtaining the lead amount is performed in real time, operation tim required gives rise to time delay and that in case the speed is obtained by computing the position detection data, operation time required gives rise to time delay also.

It is, therefore, an object of the invention to provide a positioning control system having a lead compensation function which has eliminated these disadvantages of the prior art system.

SUMMARY OF THE INVENTION

For achieving the above described object of the invention, the positioning control system according to the invention is characterized in that it comprises position detection means for detecting position of an object to be controlled, memory means for storing position data detected by the position detection means, time data supply means for supplying time data as a lead compensation parameter, compensation means for taking out position data preceding by time corresponding to the supplied time data from the memory means and correcting at least one of present position data and target position data in accordance with difference between the taken out position data and the present position data detected by the position detection means, and control signal generation means for generating a control signal relating to the position of the object in accordance with the present position data and the target position data corrected by the compensation means.

An example of locus of position data detected by the position detection means with respect to lapse of time is shown in FIG. 2. This position data is stored in the memory means. If time corresponding to time data supplied as lead compensation parameter is represented by $\Delta t$, the compensation means takes out position data $X(-\Delta t)$ which is preceding the present time point by $\Delta t$ from the memory means and corrects at least one of present position data and target position data, using difference $\Delta x$ between the taken out position data and the present position data as the lead compensation amount. For example, the compensation means adds $\Delta x$ to the present position data and thereby causes the present position data in appearance to advance by the lead compensation amount $\Delta x$. Thus, the present position data in appearance which has been compensated for lead is one estimating position of the object at a time point which is $\Delta t$ after the present time. Alternatively stated, position after $\Delta t$ can be estimated by adding the difference $\Delta x$ in position at the time point $\Delta t$ before.

The time data $\Delta t$ may be supplied suitably in accordance with a desired lead compensation amount. If, for example, a stop positioning control is performed by using a brake system, time $\Delta t$ required from an instant at which braking is applied till an instant at which the object actually stops is estimated and this $\Delta t$ is supplied as the time data. In this case, the difference $\Delta x$ corresponds to an estimated amount of sliding of the brake corresponding to the time $\Delta t$. The compensation means effects lead compensation corresponding to this estimated amount of sliding of the brake by using this $\Delta x$ as the lead compensation amount in the positioning control. $\Delta t$ need not be a known fixed value but may be established and changed suitably. The same operation is performed not only in the above described stop control using the braking system but in other types of positioning controls by supplying the time data Δt corresponding to a desired lead compensation amount.

As described above, there is time delay between a time point at which a positioning command has been issued (e.g., applying a brake) and a time point at which positioning is actually made (e.g., stopping) with a result that overrun (e.g., the amount of sliding of the brake) is generated. By performing the lead compensation corresponding to Δt as described above, the amount of overrun is cancelled and an actually obtained positing (e.g., stop position) can approach a target position to a maximum extent possible.

It is possible to preestimate the amount of overrun in consideration of various factors such as inertia characteristics of the machine, time delay in operation, speed and acceleration and also it is also possible to establish the time data Δt previously in accordance with these preestimable factors. In other words, by establishing the time data Δt at a proper value by previous learning, the overrun amount can be cancelled and the actually obtained position can coincide with the target position as described above.

In a case where the time data Δt which has been established by preestimation or previous learning is not perfect (perfect preestimation or perfect previous learning is impossible) or in a case where change in load conditions on the machine or change in characteristics of the machine due to aging has occurred, this established time data Δt becomes inaccurate resulting in inaccuracy in the positioning control.

Accordingly, it is a characteristic feature of the invention to further comprise correction means for detecting an error between a target position and an actually obtained position to correct the time data Δt in accordance with this error.

When, for example, lead compensation is performed with the time data Δt=Δt1 and error between a target position T and an actually obtained position B is −d2 as shown in FIG. 3a, time data Δt is corrected in accordance with this −d2. If, for example, time corresponding to this −d2 is −Δtd, correction is made in such a manner that the time data Δt becomes Δt=Δt1−Δtd t2 and Δt=t2 is used in the next positioning control as new time data. If, for another example, lead compensation is performed with the time data Δt=t1 and error between the target position T and the actually obtained position B is +d2 as shown in FIG. 3b, the time data Δt is corrected in accordance, with this +d2. If, for example, time corresponding to this +d2 is +Δtd, correction is made in such a manner that the time data Δt becomes Δt=Δt1+Δtd=Δt2 and Δt=Δt2 is used in the next positioning control as new data. In FIGS. 3a and 3b, A represents a position at a time point at which the positioning command (e.g., a brake-on command) is issued.

A learning function (previous learning function) is realized by constantly correcting time data used in the lead compensation whereby the problems of change in load condition on the machine and change in the characteristics of the machine due to aging are overcome and an accurate positioning control can be realized.

In a case where the time Δt which has been established as the lead compensation parameter has become excessively large, the difference Δx between the position before Δt and the present position is not likely to correspond exactly to the speed at the present time point. In other words, the possibility that the speed changes during the time Δt increases. For this reason, position data to be read out of the memory means should preferably be one which is as near to the present time point as possible. In one aspect of the invention, therefore, position data which is preceding by Δt/N (where N is any natural number) corresponding to 1/N of time Δt which has been supplied as the lead compensation parameter is taken out of the memory means and difference Δx between the taken out position data and the present position data is substantially multiplied by N to obtain difference N·Δx corresponding to the established time Δt and this N·Δx is used as the lead compensation amount. This is shown in FIG. 4. By this arrangement, data reflecting the present speed as much as possible can be used as the lead compensation amount even when the time Δt supplied as the lead compensation parameter is relatively large so that an accurate lead compensation can be ensured. Further, the memory means which stores position data need not store relatively old data so that the memory capacity of the memory means can be saved.

Preferred embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
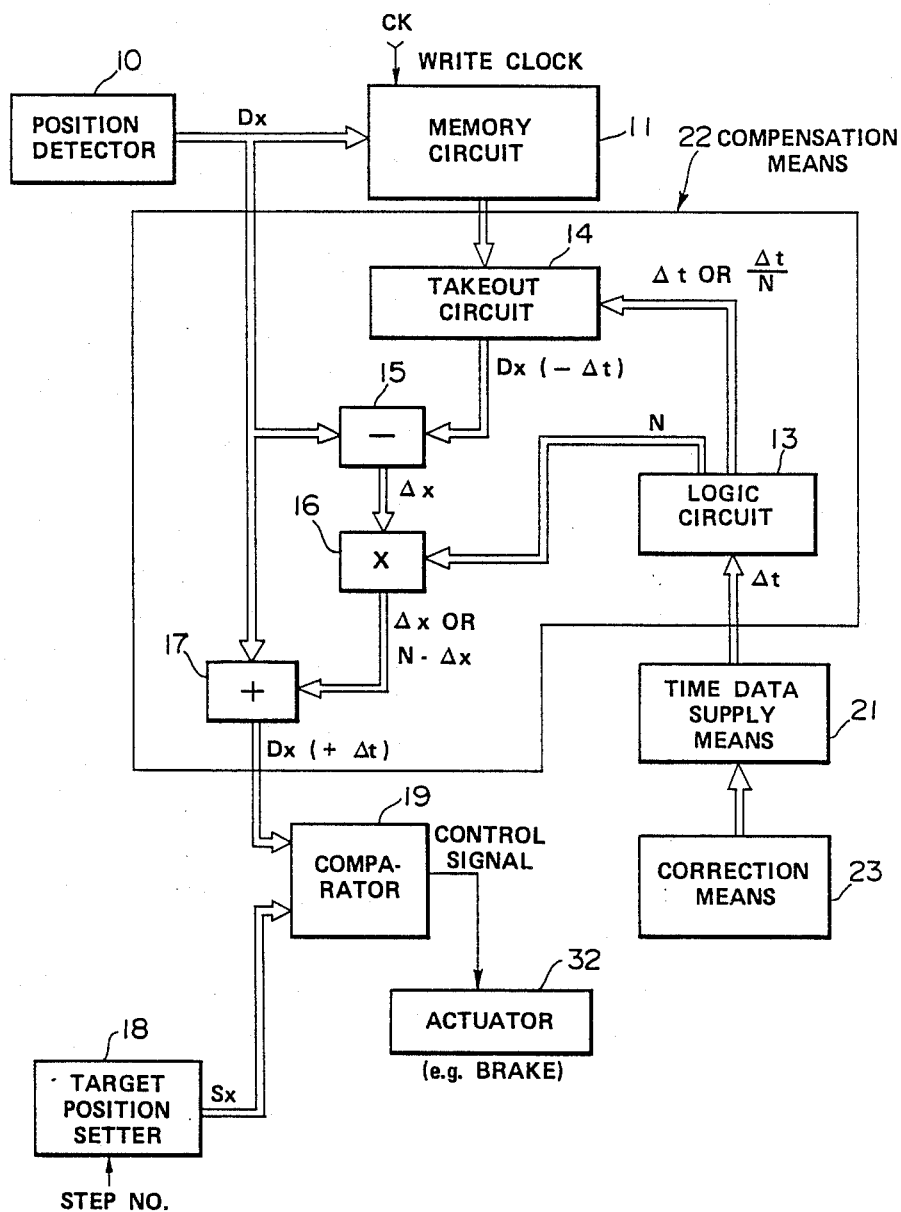
FIG. 1 is a block diagram showing an embodiment of the positioning control system according to the invention.

Referring first to FIG. 1, a position detector 10 detects position of an object of the positioning control and outputs digital position data Dx. If the object of the positioning control is a rotating device such as a motor, a rotational type position detector is used whereas if the object of the positioning control is a linearly displacing device such as a cylinder, a linear type position detector is used. A memory circuit 11 sequentially stores the detected position data Dx in response to a write clock pulse CK and is constructed of a shift register or a RAM (random access memory).

Time data supply means 21 supplies time data as a lead compensation parameter. Time corresponding to the supplied time data is referred to as established lead time Δt. Compensation means 22 takes out position data which is preceding by length of time corresponding to the supplied time data from the memory circuit 11 and corrects at least one of present position data and target position data by using difference between the taken out position data and the present position data as a lead compensation amount.

Correction means 23 detects an error between a target position and an actual stop position and corrects the time data supplied to the time data supply means 21 in accordance with this error.

In the compensation means 22, a logic circuit 13 establishes a ratio N in a predetermined manner in accordance with the magnitude of the established lead time $\Delta t$ corresponding to the time data supplied by the time data supply means 21 and outputs data representing time $\Delta t/N$ which is 1/N of the established lead time t. If the ratio N is fixed to 1, such logic circuit 13 is unnecessary. Alternatively, data which is previously divided into $\Delta t$ and N may be supplied from the time data supply means 21 instead of providing the logic circuit 13.

A takeout circuit 14 takes out position data $Dx(-t)$ which is preceding the present time by $\Delta t$ or $\Delta t/n$ from the memory circuit 11 in response to the time data $\Delta t$ or $\Delta t/N$ supplied from the logic circuit. This takeout circuit 14 is constructed, for example, of a selection circuit which selects an output of a desired stage of a shift register if the memory circuit 11 is constructed of a shift register and constructed of a readout circuit designating a desired address of a RAM and reading out stored data if the memory circuit 11 is constructed of the RAM.

A subtractor 15 subtracts the preceding position data $Dx(-\Delta t)$ taken out by the takeout circuit 14 from the data Dx representing the present position to obtain difference $\Delta x = Dx - Dx(-\Delta t)$. The difference $\Delta x$ thus obtained corresponds to the amount of displacement of the object during the newest time interval $\Delta t$ or $\Delta t/N$. The greater the speed of displacing of the object is, the larger is the amount of displacement, i.e., the difference $\Delta x$. A multiplier 16 performs the operation of multiplying the difference $\Delta x$ by N, using the data N provided by the logic circuit 13 as multiplier. The difference data $N \cdot \Delta x$ or $\Delta x$ (when N=1) which has been multiplied by N is added to the present position data Dx by an adder 17 whereby data $Dx(+\Delta t) = Dx + N \cdot \Delta x$ representing a preestimated position upon lapse of the lead establishing time $\Delta t$ is obtained. In this manner, lead compensation of the position data is achieved.

A target position setter 18 is provided for setting data indicating a target position in the stop control or other suitable operation control.

A comparator 19 compares set target position data Sx with the position data $Dx(+\Delta t)$ which has been compensated for lead and, when the two data coincide with each other, outputs a control signal for the stop control or other operation control. The comparator 19 corresponds to the control signal generation means. The control signal may be applied to an actuator 32 of a known type for utilizing it as a signal equivalent to an output of a limit switch or a cam switch known in the conventional positioning control or, alternatively, may be used as a deviation signal for servo control. In the case of a machine including a backing system, the braking system constitutes the actuator 32 and the brake is applied in response to this control signal. In this manner, the positioning control is performed in the lead compensated state. The positioning control herein includes not only the stop control but other controls in which an operation of an actuator is controlled at a desired specific position.

If, for example, there is time delay of $\Delta t$ in an object positioning control system and lead compensation is not made in this system, the control is implemented from a time point $\Delta t$ after the actual position Dx has reached the target position Sx and, in this case, the present position has exceeded the target position. If, on the contrary, the lead compensation is made as in the above described embodiment, the lead compensated present position data $Dx(+\Delta t)$ in appearance coincide with the target position data Sx before the present position has reached the target position and, when the control is implemented $\Delta t$ later, real present value Dx has just reached the target value Sx. Accordingly, an accurate positioning control is performed.

The subtractor 15 for directly obtaining the difference $\Delta x$ and the multiplier 16 for directly multiplying the difference $\Delta x$ by N are not indispensable but the difference $\Delta x$ or the difference $\Delta x$ multiplied by N may be obtained in any other manner. For example, since the lead compensated position data $Dx(+\Delta t)$ is $Dx(+\Delta t) = Dx + N(Dx - Dx(-\Delta t)) = (N+1)Dx - N \cdot Dx(-\Delta t)$ after all, when N is 1, $Dx(+\Delta t)$ can be obtained omitting the operation for obtaining the difference $\Delta x$ by directly performing the operation of $2Dx - Dx(-\Delta t)$ and, when N is 2 or more, the difference $\Delta x$ can be obtained by performing multiplication of Dx by (N+1) and multiplication of $Dx(-\Delta t)$ by N first and then performing subtraction between products of these multiplications. Such roundabout operation of course requires a complicated operation circuit (particularly a multiplier) and therefore is not preferable. Nevertheless, such roundabout operation is substantially equivalent to obtaining the difference $\Delta x$ and multiplying it by N so that it is within the scope of the invention. The subtractor 15 may be provided between the memory circuit 11 and the takeout circuit 14.

Figure 5:
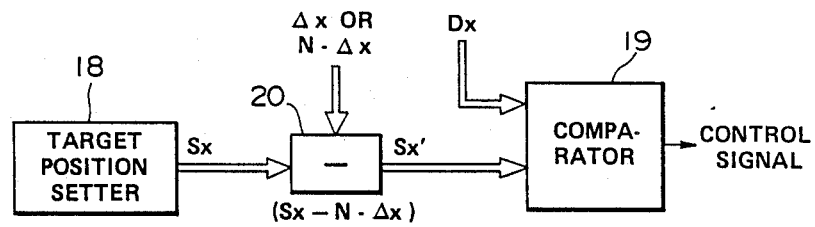
FIG. 5 is a block diagram showing a modified embodiment of the invention with respect to modified parts.

The lead compensation is achieved not only by advancing the position data Dx as shown in FIG. 1 but also by decreasing the target position data Sx as shown in FIG. 5. In FIG. 5, the construction of the omitted portion is the same as that of FIG. 1 and a modified portion only is illustrated. A subtractor 20 subtracts difference data $N \cdot \Delta x$ or $\Delta x$ provided by a multiplier 16 from target position data Sx provided by a setter 18 thereby relatively decreasing the target position. Thus, the compensated target position data $Sx' = Sx - N \cdot \Delta x$ is applied to a comparator 19 where it is compared with data Dx representing real present position and a control signal is generated when the two data coincide with each other. In other words, coincidence occurs in the comparator 19 when the apparent target position $Sx'$ is established at a position before the real target position Sx by $N \cdot \Delta X$ or $\Delta X$ and the real present position Dx reaches the apparent target position $Sx'$. Therefore, the real present position Dx reaches the real target position Sx when the control is implemented $\Delta t$ later.

The lead compensation can be achieved also by correcting both the position data Dx and the target position data Sx by suitable amounts. For example, $N \cdot \Delta X/2$ may be added to Dx and $N \cdot \Delta X/2$ may be subtracted from Sx and results of these operations may be compared with each other.

An example of relation between the value of N and the established lead time $\Delta t$ will be described.

Assuming that the number of memory positions (i.e., the number of addresses or stages) is 199 and the period of write clock pulses CK is 0.1 ms in the memory circuit 11, the memory circuit 11 can store position data for 199 samples preceding to 19.9 ms before at an interval of 0.1 ms. In the case of N=1 (in this case, the logic circuit 13 and the multiplier 16 in FIG. 3 are unnecessary), therefore, the established lead time $\Delta t$ which can be established is within the range of 0.1 ms to 19.9 ms and the lead time $\Delta t$ can be established at the interval of 0.1 ms.

In the range in which the established lead time Δt is 20 ms to 39.8 ms, position data at Δt/N=10 ms to 19.9 ms before may be taken out of the memory circuit 11 by setting N at 2. In this case, Δt can be established at an interval of 0.2 ms.

In the range in which the established lead time Δt is 100 ms to 199 ms, position data at Δt/N=10 ms to 19.9 ms before may be taken out of the memory circuit 11 by setting N at 10. In this case, Δt can be established at an interval of 1 ms.

The above examples are summarized in the following Table 1:

TABLE 1

| Δt (established data) | N | Δt/N (taken out data) |
|---|---|---|
| 0.1 ms | 1 | 0.1 ms |
| 0.2 | | 0.2 |
| . | | . |
| . | | . |
| . | | . |
| 19.9 | | 19.9 |
| 20 ms | 2 | 10 ms |
| 20.2 | | 10.1 |
| .. | | . |
| . | | . |
| . | | . |
| 39.8 | | 19.9 |
| 40 ms | 5 | 8 ms |
| 40.5 | | 8.1 |
| . | | . |
| . | | . |
| . | | . |
| 99.5 | | 19.9 |
| 100 ms | 10 | 10 ms |
| 101 | | 10.1 |
| . | | . |
| . | | . |
| 199 | | 19.9 |

Figure 6:
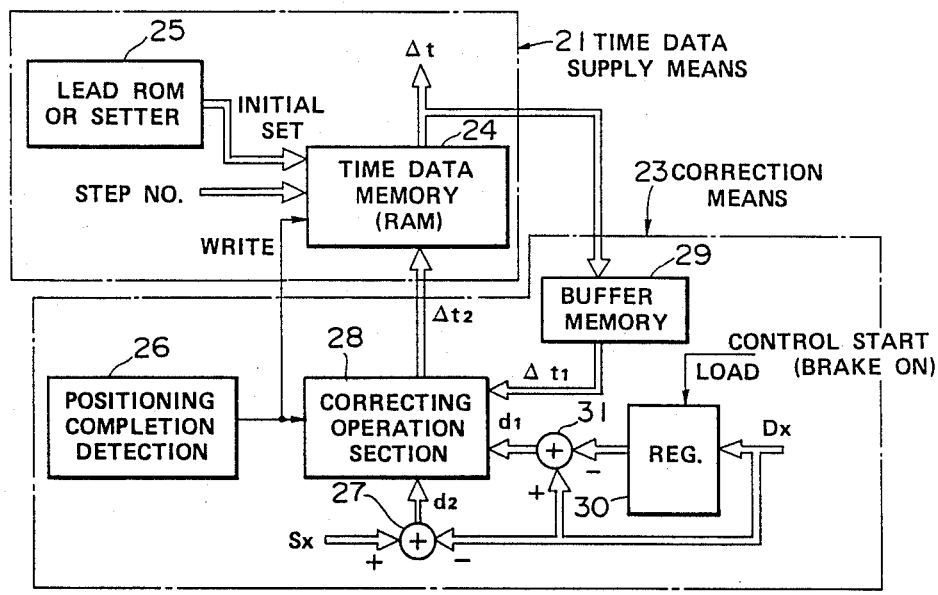
FIG. 6 is a block diagram showing a specific example of time data supply means and correction means of FIG. 1.
Figure 7:
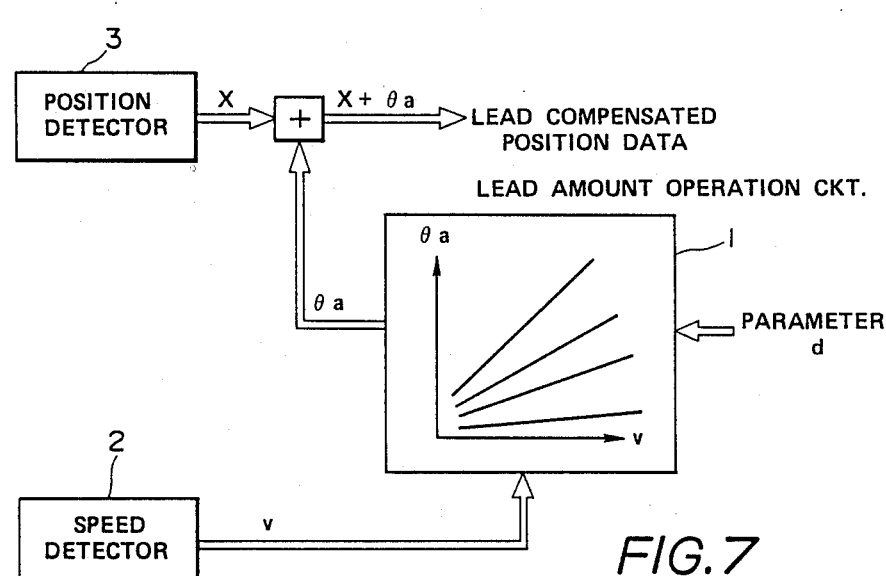
FIG. 7 is a block diagram showing an example of the prior art positioning control system.

An example of the time data supply means 21 will now be described with reference to FIG. 6. A time data memory 24 is constructed of a memory capable of both reading and writing such as a RAM. The memory 24 has addresses corresponding to each of one or more positioning steps and stores the above described time data Δt for each of the steps. The time data Δt stored in this time data memory 24 is initially established in response to an output from a lead ROM or setter 25. The initially established time data Δt is preestimated or previously learned in accordance with various factors such as inertia characteristics and time delay in operation of the machine or established (or detected) speed or acceleration and therefore may be called a previously learned value. Instead of making the initial establishment, the time data Δt may be initially set at 0. Read and write addresses in this time data memory 24 are designated by a step number signal supplied from an exterior sequencer or the like device. Upon detection of completion of positioning by a positioning completion detection circuit 26 to be described later, the memory 24 becomes a write mode at a predetermined timing and otherwise stays in a read mode. The step number signal is supplied also to the target position setter 18 (FIG. 1) so that target position data corresponding to the designated positioning step is produced.

Figure 2:
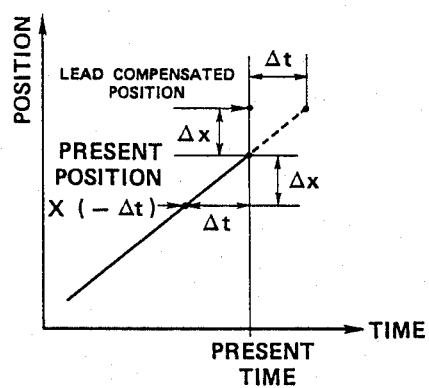
FIGS. 2 through 4 are diagrams showing a view for explaining the operation of the system according to the invention.
Figure 4:
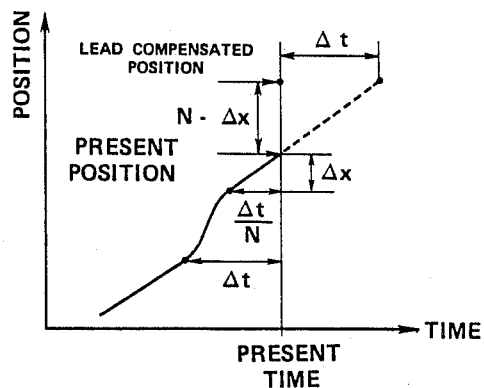
Figure 3A:
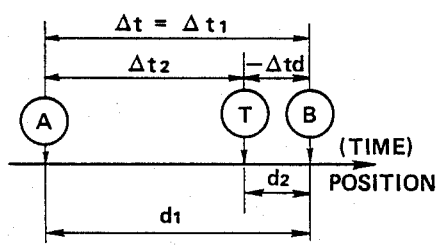
Figure 3B:
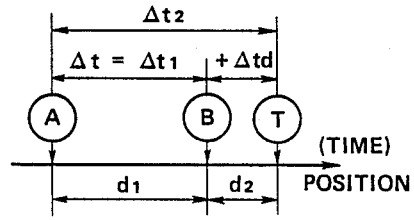

In the correction means 23, an error operator 27 computes an error (Sx−Dx) between the target position Sx and the actually obtained position (present position Dx) upon completion of the positioning. This error Sx−Dx has a positive or negative sign and corresponds to ±d2 in FIG. 2. A correction operation section 28 corrects the time data Δt in accordance with this error data. A buffer memory 29 temporarily stores the time data Δt read from the time data memory 24 and thereafter supplies it to a correcting operation section 28. A position register 30 stores position data Dx at a time point at which a control signal (e.g., a brake-on signal) is provided by the comparator 19 (FIG. 1). By subtracting the position data stored in this register 30 from the present position data (actual stop position data) Dx at the time of completion of the positioning in a subtractor 31, the overrun amount d1 (i.e., the amount of sliding of the brake) is obtained. An example each of the overrun amount d1 and the positioning error d2 is shown in FIGS. 3a and 3b.

In the correcting operation section 28, an operation is made by using a predetermined function in accordance with the time data (designated by Δt1) stored in the buffer register 29, the data of the overrun amount d1 provided by the subtractor 31 and the error d2 provided by the error operator 27 and new time data Δt2 which is modification of the time data Δt1 is produced. This modified time data Δt2 is applied to data input of the time data memory 24. An example of the function operation implemented in the correcting operation section 28 will be described below.

Assuming, as the simplest example, that relation between time and overrun amount is a linear function, there is the following proportional relation among the time data Δt1 used as the lead compensation data in the positioning control which has been completed this time, the overrun amount d1 generated in correspondence to this time data, the error d2 in the positioning control which has been completed this time and data Δtd which is data obtained by converting this error d2 to time:

$$\Delta t1 : \Delta td = = d1 : d2$$

From this relation, $$\Delta td = \Delta t1 \, (d2/d1)$$

and Δtd has a positive or negative sign corresponding to the positive or negative sign of d2. It is understood from this that the time data Δt1 used this time has the error of Δtd in terms of the time data. This error can be corrected by performing the operation Δt2=Δt1+Δtd (where Δtd has a positive or negative sign) whereby new time data Δt2 which is corrected time data Δt1 is obtained.

This operation is performed upon completion of the positioning in response to the output of the positioning completion detection circuit 26. The obtained corrected time data Δt2 is written in the time data memory 24 (i.e., at the address designated by the step number signal) which has become the write mode in response to the output of the positioning completion detection circuit 26. The time data Δt1 stored in the memory 24 thereby is rewritten to t2. Thus, in the next positioning control of the same step number, the corrected data Δt2 is read from the memory 24 as the time data Δt and supplied to the compensation means 22 (FIG. 1). This corrected time data Δt2 is the best data which reflects to the maximum extent possible the newest conditions of various factors such as the newest load condition or operation condition of the object to be controlled and may be called the best lead compensation data which includes both the initially established previously learned value and the reviewed value. By employing the time data Δt which is constantly renewed by performing of the learning function as the lead compensation data in the positioning control, a positioning control which is always accurate can be expected.

The positioning completion detection circuit 26 detects completion of the positioning on a suitable condition such that the speed of the object of the control has become zero or that a predetermined time has elapsed from a time point at which a control signal was produced.

In the above described embodiment, different time data Δt is used for each of the steps. Alternatively, common time data Δt may be used for the respective steps. In that case, the time data memory 24 may have only one address.

The operation implemented in the correcting operation section 28 is not limited to the above described example. For example, the relation between time and overrun (e.g., the amount of sliding of the brake) may be expressed in an accurate function (e.g., function of second order) and a predetermined operation may be implemented in accordance with this function.

As the position detector 10, any type of detector may be used so long as it can continuously detect position of the object and generate position data in digital. For example, an absolute encoder an incremental encoder and a counter counting its output pulse and a resolver and means for obtaining digital position detection data in response to output signal of the resolver may be used. In particular, the inductive type (variable reluctance type) rotary position detector or linear position detector using the phase shift system as disclosed in the applicant's copending U.S. Pat. Nos. 4,612,503, 4,604,575, 4,556,886 and 4,572,951 may preferably be used. In these types of position detectors using the phase shift system, digital count value representing phase difference of a secondary output ac signal is sampled at each phase 0 of a reference ac signal exciting a primary coil and this digital count value is provided as the position detection data Dx. As the loading clock pulse CK in the memory circuit 11, this sampling clock pulse (i.e., clock pulse synchronized with the reference ac signal) may be used.

In the above described embodiment, the circuit is constructed of a hard-wired logic. The same function, however, may be performed by a software program using a microcomputer and tee positioning control using such software program is within the scope of the invention.

As will be understood from the foregoing, according to the invention, time data is used as lead compensation parameter, position data which is preceding by time length corresponding to this time data is taken out of the memory means and difference between this position data and present position data is used as the lead compensation amount in the positioning control operation. By this arrangement, a complicated function operation considering factors such as speed and acceleration for obtaining the lead compensation amount is obviated. Furthermore, since the time data used as the lead compensation parameter is corrected in accordance with a past positioning error and the corrected time data is use in the next positioning control, the accuracy in the positioning control is further improved.

What is claimed is:

1. A positioning control system comprising:
   position detection means for detecting the position of an object to be controlled and providing position data corresponding thereto;
   memory means for storing the position data provided by said position detection means;
   time data supply means for supplying time data as a lead compensation parameter;
   target position data supply means for providing target position data;
   compensation means for reading out position data corresponding to the position of the object at a preceding time, wherein said preceding time is related to the time data supplied from said memory means, and modifying at least one of the present position data and the target position data in accordance with the difference between the read out position data and the present position data detected by said position detection means; and
   control signal generation means for generating a control signal relating to the position of said object in accordance with the present position data and the target position data modified by said compensation means.

2. A positioning control system as defined in claim 1 further comprising correction means for detecting an error between the position of said object actually positioned in response to the control signal and a target position and correcting the time data supplied by said time data supply means in accordance with this error.

3. A positioning control system as defined in claim 1 wherein said compensation means reads out position data corresponding to the position of the object at a preceding time which is 1/N of the time corresponding to the time data supplied by said time data supply means from said memory means and modified at least one of the present position data and the target position data in accordance with a value which is N times as large as the difference between the read out position data and the present position data.

4. A positioning control system as defined in claim 2 wherein said time data supply means comprises setting means for establishing an initial value of the time data and said time data supply means initially supplies this initial value as the time data and subsequently supplies the data corrected by said correction means.

5. A positioning control system as defined in claim 1 wherein said time data supply means generates the time data individually for each of plural target positions.

6. A positioning control system as defined in claim 1 further comprising control means for controlling the motion of said object in response to said control signal and correction means for detecting an error between the position of said object which has actually been positioned in response to the control signal and a target position and for detecting the difference between the position of said object at the time at which the control is started in response to the control signal and at the time at which the control has been completed in response to the control signal, and corrects the time data supplied by said time data supply means in accordance with said error and said difference.

7. A positioning control system as defined in claim 1 wherein said object includes brake means for braking said object, wherein said control signal generation means generates a control signal for initiating braking of said object said brake means when the present position data corrected by said compensation means and the target position data have coincided with each other.

8. A positioning control system as defined in claim 1 wherein said control signal generation means comprises comparison means for comparing the present position data modified by said compensation means and the target position data and control signal generation means for generating the control signal for positioning said object in accordance with the output of said comparison means.

9. A positioning control means as defined in claim 1 wherein said compensation means modifies the present position data in such a manner that the present position data is increased in accordance with the difference between the position data taken out of said memory means and the present position data detected by said position detection means.

10. A positioning control means as defined in claim 1 wherein said compensation means modifies the target position data in such a manner that the target position data is decreased in accordance with the difference between the position data taken out of said memory means and the present position data detected by said position detection means.

* * * * *